United States Patent
Zhang et al.

(10) Patent No.: US 8,499,835 B2
(45) Date of Patent: Aug. 6, 2013

(54) WELL SERVICE COMPOSITIONS FOR CONSOLIDATION OF PARTICULATES IN SUBTERRANEAN COAL SEAMS

(75) Inventors: Kewei Zhang, Calgary (CA); Chris Wiggins, Calgary (CA)

(73) Assignee: Trican Well Services, Ltd., Calgary (CA)

( * ) Notice: Subject to any disclaimer, the term of this patent is extended or adjusted under 35 U.S.C. 154(b) by 582 days.

(21) Appl. No.: 12/664,036

(22) PCT Filed: Jun. 13, 2008

(86) PCT No.: PCT/CA2008/001154
§ 371 (c)(1),
(2), (4) Date: Sep. 21, 2010

(87) PCT Pub. No.: WO2008/151447
PCT Pub. Date: Dec. 18, 2008

(65) Prior Publication Data
US 2011/0011589 A1    Jan. 20, 2011

Related U.S. Application Data

(60) Provisional application No. 60/929,112, filed on Jun. 13, 2007.

(51) Int. Cl.
*E21B 43/22* (2006.01)
*C09K 8/565* (2006.01)
*C09K 8/82* (2006.01)

(52) U.S. Cl.
USPC .......... 166/300; 166/292; 166/309; 507/261; 507/265; 507/266

(58) Field of Classification Search
None
See application file for complete search history.

(56) References Cited

U.S. PATENT DOCUMENTS

| | | |
|---|---|---|
| 3,595,390 A | 7/1971 | Booth |
| 3,696,923 A | 10/1972 | Miller |
| 4,725,351 A | 2/1988 | Mehrotra |
| 4,857,221 A | 8/1989 | Brookes |
| 2005/0092489 A1 * | 5/2005 | Welton et al. .............. 166/280.2 |

FOREIGN PATENT DOCUMENTS

EP    113 310 A2    7/1984

* cited by examiner

*Primary Examiner* — Zakiya W Bates
(74) *Attorney, Agent, or Firm* — Nathan W. Johnson; Nicholas J. Landau; Bradley Arant Boult Cummings LLP

(57) ABSTRACT

A method of agglomerating coal particles in a subterranean formation having a coal seam, comprising the steps of providing (a) a fluid having an aqueous medium and a first collector and/or a frother; (b) pumping the fluid into the formation and (c) contacting coal particles in the formation thereby agglomerating the contacted coal particles.

44 Claims, No Drawings

WELL SERVICE COMPOSITIONS FOR CONSOLIDATION OF PARTICULATES IN SUBTERRANEAN COAL SEAMS

FIELD OF INVENTION

This invention relates to fluid compositions and their use in drilling and servicing well in subterranean coal seams.

BACKGROUND OF THE INVENTION

Subterranean coal seams contain enormous amounts of natural gas, primarily in the form of methane. Coal seams also contain a network of cleats that typically contain water. The bulk of the gas is adsorbed onto the coal matrix. The recovery of the methane gas from the formation generally involves drilling a well, hydraulically fracturing the formation and producing formation water (dewatering) from the coal seams thereby reducing the formation pressure. Upon reduction of formation pressure, methane gas desorbs and flows through the cleat network to the wellbore.

The recovery of methane gas from coal seams is different from the recovery of gas from conventional formations such as sandstone or limestone type formations. The lithology and mineralogy of the coal are substantially different. Also, the gas in coal seams is adsorbed on the matrix of the coal while the gas occupies the interstices of the sandstone or limestone formations. Generally, the desorbed gas seeps through the cleat networks in coal seams to the created fractures and then flows to the wellbore. The permeability of the coal seam is determined to a great extent by the cleat network. Compared to conventional sandstone or limestone, coal is much more soft and brittle. Therefore, during drilling, fracturing or other well operations, substantial amounts of coal fines are generated. Coupled with generally low formation pressure, the coal fines can readily penetrate into cleats causing great damage to the permeability of the coal seam leading to reduced gas production.

Water-based drilling fluids are widely used in drilling wells in coal seams. Among them, straight water or brine is commonly used, due mainly to their low cost. During the drilling operation, large amounts of coal particles, ranging from fines to pebbles, are generated. Drilling fluid, such as water or brine, is circulated through the wellbore and transports the particles out of the wellbore. However, during the operation there are substantial amounts of particles, which fail to be transported out of the well by water or brines. Significant amounts of fines will penetrate into cleats reducing formation permeability. It is difficult to transport large pebbles out of the wellbore by water or brines. The remaining large pebbles in the wellbore reduce the drilling rate.

After the wells are completed and fractured, it is not unusual for there to be large amounts of coal particles, ranging from fines to pebbles, left in the wellbore. These coal particles impede the dewatering and gas production and thereby need to be removed from the wellbores. Water or brines are often circulated through the wellbore at a high flow rate to carry the particles out. It is known that turbulent flow condition plays an important role. Foaming surfactants are sometimes added to generate foamed fluid to facilitate the particle removal. Despite its wide applications, this technique faces several challenges. One of them is its ineffectiveness in removing debris, especially those large pebbles in horizontal wells.

In order to produce methane gas from coal seams economically, the coal formation normally needs to be hydraulic fractured. In a hydraulic fracturing operation, a fracturing fluid is injected through a wellbore into a subterranean formation at a pressure sufficient to initiate fractures to increase gas production. Frequently, particulates, called proppants, are carried into the fractures as slurry by the fracturing fluid. Proppants include sand, ceramic particles, glass spheres, bauxite (aluminum oxide), and the like. Among them, sand is by far the most commonly used proppant. The most commonly used fracturing fluids for coal seams are aqueous fluids, including water, brines, or water containing polymers or viscoelastic surfactants. At the last stage of the fracturing treatment, fracturing fluid is flowed back to surface and proppants are left in the fractures to prevent them from closing back after pressure is released. The proppant-filled fractures provide highly conductive channels that allow gas to flow to the wellbore more efficiently. The conductivity of the proppant packs formed after proppant settles in the fractures plays a dominant role in increasing oil and gas production.

SUMMARY OF THE INVENTION

A composition and a method of drilling wells in coal seams more effectively, and with less formation damage.

A composition and a method of removing coal debris from wellbore more effectively.

A composition and a method that reduces the detrimental effects of coal fines during fracturing treatments.

In one aspect, the invention relates to a method of agglomerating coal particles in a subterranean formation having a coal seam, comprising the steps of providing a fluid having an aqueous medium and a first collector and/or a frother; pumping the fluid into the formation and contacting coal particles in the formation thereby agglomerating the contacted coal particles.

In accordance with another aspect, the invention relates to a well service fluid composition for use in subterranean coal seams comprising an aqueous medium; a collector for coal and/or a frother; and a gas.

In accordance with a further aspect, the invention relates to a method of agglomerating coal particles in an aqueous medium containing coal particles, comprising the steps of adding a collector and/or a frother to the aqueous medium; forming a slurry of the coal particles and the aqueous medium; introducing a gas into the slurry thereby agglomerating the contacted coal particles.

DETAILED DESCRIPTION OF THE INVENTION

Froth flotation has been widely used in coal beneficiation. In this method, coal is ground to a fine powder and mixed with water containing collecting reagents and, optionally, frothing reagents. When air is blown through the mixture, hydrophobic coal particles cling to the bubbles, which rise to form froth on the surface and are collected in a thick layer of froth which is skimmed off. The waste materials (gangue), which are mainly minerals, which include clay, silica, carbonate, and iron pyrite, are mostly hydrophilic and remain in the aqueous suspension. The primary mechanism in such a flotation process is the selective aggregation of micro-bubbles with hydrophobic particles under dynamic conditions to lift the particles to the liquid surface. It has been demonstrated that hydrophobic particles are bound together by micro-bubbles to form agglomerates, known as bubble agglomerates. The gas bubbles are encapsulated by small hydrophobic particles. The attached particles increase the stability of the froth. Such bubble-particle agglomerates are commonly obtained in the flotation of coal. More details can be found in *An Introduction* to the *Theory of Flotation* (V. I. Klassen and V. A. Mokrousov, Butterworth, London, 1963) which is incorporated herein by reference.

Collecting agents, known as collectors, are chemical agents that are able to selectively make desired mineral surfaces more hydrophobic to permit the formation of the agglomerations between the particles and the micro-bubbles and thus promote separation. Frothers are chemical agents added to the mixture to promote the generation of semi-stable froth.

Compounds useful as frothers include low molecular weight alcohols including methyl isobutyl carbinol (MIBC), amyl, hexyl, heptyl and octyl, and diethyl isohexyl alcohols, pine oil and glycol ethers.

The most commonly used collectors for coal are hydrocarbon oils such as kerosene, fuel oil, or a $C_5$ to $C_8$ hydrocarbon. The natural hydrophobicity of coal is an asset which minimizes the use of collectors. In coal flotation, the collectors and frothers can be used alone or in combination. For example, small amount of isooctane can be used alone or in combined with pine oil, or small quantity of MIBC or pine oil can act as both collector and frother in coal flotation.

Similarly, there are a wide variety of chemical agents are useful as collectors and frothers for flotation of silica particles. Amines such as simple primary and secondary amines, primary ether amine and ether diamines, tallow amines and tall oil fatty acid/amine condensates are known to be useful collectors for silica particles. It is well established that these chemical compounds strongly adsorb to sand surface and change the sand surface from hydrophilic to hydrophobic. In fact, the reason that these compounds are used as collectors is because of their capability of hydrophobising sand surfaces to allow formation of stable sand/bubble aggregations. The preferred collectors are amine collectors having at least about twelve carbon atoms. These collectors are commercially available from, for example, Akzo Nobel or Tomah Products Inc. Other possible collectors are oleate salts which normally need presence of multivalent cations such as $Ca^{++}$ or $Mg^{++}$ to work effectively.

Froth flotation technology has been used for decades in mineral processing and the theory of flotation has been fairly established. In this invention, the theory of froth flotation is used to develop well service fluids and methods to improve well production, and in particular, to improve well production in coal seams.

For instance, in drilling wells in coal seams with water or brines as the drilling fluid, small quantity of hydrocarbon, including kerosene, fuel oil, or a $C_5$ to $C_8$ hydrocarbon, is added into the fluid. Standard fluid mixing and drilling procedures known in the art can be employed. The concentration of the hydrocarbon is approximately in the range of 0.02-1.5 L per ton of coal. The hydrocarbon tends to form a film on the coal surface and make it more hydrophobic. During drilling, air, nitrogen or carbon dioxide can be introduced into the aqueous coal slurry formed in situ. The hydrophobic coal particles in the slurry become attached to gas bubbles, which make it much easier to be transported out of wellbore. Furthermore, the micro-bubbles tend to act as an adhering medium, with the result being the micro-bubbles act with the coal particles including coal fines to form bubble agglomerates. The formation of the bubble agglomerates reduces the amount of coal fines in the suspension and therefore the chance of these coal fines entering into the cleat networks in coal seams, resulting in less formation damages. Alternatively, small quantity of frothers, including methyl isobutyl carbinol (MIBC), amyl, hexyl, heptyl and octyl, and diethyl isohexyl alcohols, pine oil and glycol ethers, can be added together with the hydrocarbon oil. Or only frother is added in replacement of the hydrocarbon oil. For example, MIBC is added in water or brine at the concentration of 50-100 ml per tone of coal. During the drilling process, other minerals, mainly clay and silica minerals, which are disseminated throughout coal seam are released into the fluid as small particles. Optionally, various collectors for silica minerals can also be added in addition to the hydrocarbon oil or/and the frothers. These collectors include simple primary and secondary amines, primary ether amine and ether diamines, tallow amines and tall oil fatty acid/amine condensates. Addition of these collectors will help float siliceous debris and further reduce formation damage from the fines.

In wellbore clean out, small amounts of a hydrocarbon oil, or a frother or a mixture of the two can be added into water or brine. The fluid is then circulated through the wellbore at a high flow rate. The attachment of micro-bubbles to the debris helps to lift the debris out of well more efficiently. Alternatively, in some instances the collectors for siliceous minerals including primary or secondary amines can also be added into the fluid such as water or brine.

Similarly, small amounts of a hydrocarbon oil, or a frother or a mixture of the two can be added into water or brine in fracturing coal seams. The formation of bubble agglomerates confine fines to micro-bubbles, with the result being that less fines enter into the cleat network causing less permeability damage. High permeability of the cleat network is essential for gas production in coal seams.

EXAMPLES

Example 1

100 ml of water and 7 grams of Manville coal drill cuttings of wide side distribution were added into each of two glass bottles (200 ml). 0.07 ml of kerosene was added into one of the bottles and the other bottle was used as control. The bottles were vigorously shaken and then let stand to allow coal particles settle down. There was a layer of coal particle floating on the top while there are no coal particles floating in the control one.

Example 2

100 ml of water and 7 grams of Manville coal drill cutting of wide side distribution were added into each of two glass bottles (200 ml). 0.07 ml of hexanol was added into one of the bottles and the other bottle was used as control. The bottles were vigorously shaken and then let stand to allow coal particles settle down. There was a layer of coal particle floating on the top while there are no coal particles floating in the control one.

Example 3

7 grams of Manville coal drill cutting, lightly ground to a roughly uniform particle size, is added into 100 ml water containing 0.05 ml of kerosene and 0.1 ml of hexanol. After vigorously shaken, let stand to allow coal particles settle down. There was about 40% of coal particles floating on the fluid surface.

What is claimed is:

1. A method of agglomerating coal particles in a subterranean formation having a coal seam, comprising:
   a. providing a fluid having an aqueous medium and at least one of a first collector and a frother;
   b. pumping the fluid into the formation and c. contacting coal particles in the formation thereby agglomerating the contacted coal particles;
wherein the first collector is a hydrocarbon oil.

2. The method of claim 1, wherein the aqueous medium is water or a brine.

3. The method of claim 1, wherein the frother is a low molecular weight alcohol.

4. The method of claim 3, wherein the alcohol is selected from the group consisting of: methyl isobutyl carbinol (MIBC), amyl, hexyl, heptyl octyl, diethyl isohexyl alcohols, pine oil and glycol ethers.

5. The method of claim 1, wherein the frother has a concentration of about 50-100 ml per ton of coal particles.

6. The method of claim 1, wherein the hydrocarbon oil has a concentration of about 0.02-1.5 L per ton of coal particles.

7. The method of claim 1, further comprising adding a gas into the fluid.

8. The method of claim 7 wherein the gas is selected from the group consisting of: air, nitrogen and carbon dioxide.

9. The method of claim 7 further comprising forming gas bubbles in the fluid thereby forming gas agglomerates of coal particles.

10. The method of claim 1, further comprising adding a second collector for silica minerals.

11. The method of claim 10, wherein the collector for silica minerals is selected from the group consisting of: simple primary amines, primary secondary amines, primary ether amines, primary ether diamines, tallow amines and tall oil fatty acid/amine condensates.

12. The method of claim 10, wherein the collector for silica minerals is an amine collector having at least about twelve carbon atoms.

13. The method of claim 10, wherein the collector for silica minerals is oleate salts.

14. The method of claim 13, further comprising adding multivalent cations.

15. The method of claim 13, wherein the multivalent cations are $Ca^{++}$ or $Mg^{++}$.

16. A well service fluid composition for use in subterranean coal seams comprising:
an aqueous medium;
at least one of a collector for coal and a frother; and
a gas
wherein the collector for coal is a hydrocarbon oil.

17. The fluid composition of claim 16, wherein the aqueous medium is water or brine.

18. The fluid composition of claim 16, wherein the frother is a low molecular weight alcohol.

19. The fluid composition of claim 18, wherein the alcohol is selected from the group consisting of: methyl isobutyl carbinol (MIBC), amyl, hexyl, heptyl octyl, diethyl isohexyl alcohols, pine oil and glycol ethers.

20. The fluid composition of claim 16, wherein the frother has a concentration of about 50-100 ml per ton of coal.

21. The fluid composition of claim 16, wherein the hydrocarbon oil is selected from the group consisting of: kerosene, fuel oil and a $C_5$ to $C_8$ hydrocarbon.

22. The fluid composition of claim 16, wherein the hydrocarbon oil has a concentration of about 0.02-1.5 L per ton of coal.

23. The fluid composition of claim 16, wherein the gas is selected from the group consisting of: air, nitrogen and carbon dioxide.

24. The fluid composition of claim 16, further comprising a collector for silica minerals.

25. The fluid composition of claim 24, wherein the collector for silica minerals is selected from the group consisting of: simple primary amines, primary secondary amines, primary ether amines, primary ether diamines, tallow amines and tall oil fatty acid/amine condensates.

26. The fluid composition of claim 24, wherein the collector for silica minerals is an amine collector having at least about twelve carbon atoms.

27. The fluid composition of claim 24, wherein the collector for silica minerals is oleate salts.

28. The fluid composition of claim 27, further comprising multivalent cations.

29. The fluid composition of claim 28, wherein the multivalent cations are $Ca^{++}$ or $Mg^{++}$.

30. A method of agglomerating coal particles in an aqueous medium containing coal particles, comprising:
a. adding at least one of a collector and a frother to the aqueous medium;
b. forming a slurry of the coal particles and the aqueous medium; and
c. introducing a gas into the slurry thereby agglomerating the contacted coal particles
wherein the collector for coal is a hydrocarbon oil.

31. The method of claim 30 wherein the collector is a hydrocarbon.

32. The method of claim 30, wherein the aqueous medium is water or brine.

33. The method of claim 30, wherein the frother is a low molecular weight alcohol.

34. The method of claim 33, wherein the alcohol is selected from the group consisting of: methyl isobutyl carbinol (MIBC), amyl, hexyl, heptyl octyl, diethyl isohexyl alcohols, pine oil and glycol ethers.

35. The method of claim 30, wherein the frother has a concentration of about 50-100 ml per ton of coal.

36. The method of claim 30, wherein the hydrocarbon oil is selected from the group consisting of: kerosene, fuel oil and a $C_5$ to $C_8$ hydrocarbon.

37. The method of claim 30, wherein the hydrocarbon oil has a concentration of about 0.02-1.5 L per ton of coal.

38. The method of claim 30, wherein the gas is selected from the group consisting of: air, nitrogen and carbon dioxide.

39. The method of claim 30, comprising adding a collector for silica minerals.

40. The method of claim 39, wherein the collector for silica minerals is selected from the group consisting of simple primary amines, primary secondary amines, primary ether amines, primary ether diamines, tallow amines and tall oil fatty acid/amine condensates.

41. The method of claim 39, wherein the collector for silica minerals is an amine collector having at least about twelve carbon atoms.

42. The method of claim 39, wherein the collector for silica minerals is oleate salts.

43. The method of claim 42, further comprising adding multivalent cations.

44. The method of claim 43, wherein the multivalent cations are $Ca^{++}$ or $Mg^{++}$.

* * * * *